United States Patent [19]
Spitz et al.

[11] Patent Number: 5,457,308
[45] Date of Patent: Oct. 10, 1995

[54] BAR CODE SCAN STITCHING

[75] Inventors: Glenn Spitz, Northport; Nelson Saenz, Ronkonkoma, both of N.Y.

[73] Assignee: Symbol Technologies, Inc., Bohemia, N.Y.

[21] Appl. No.: 127,900

[22] Filed: Sep. 14, 1993

[51] Int. Cl.⁶ .................................................. G06K 7/10
[52] U.S. Cl. ........................................................ 235/462
[58] Field of Search ................................... 235/462, 463

[56] References Cited

U.S. PATENT DOCUMENTS

| | | | |
|---|---|---|---|
| 3,723,710 | 3/1973 | Crouse et al. | 235/61.11 E |
| 3,938,089 | 2/1976 | McGregor et al. | 340/146.3 |
| 3,949,363 | 4/1976 | Holm | 340/146.3 D |
| 4,059,224 | 11/1977 | Seligman | 235/462 |
| 4,075,461 | 2/1978 | Wu et al. | 235/466 |
| 4,239,151 | 12/1980 | Enser et al. | 235/437 |
| 4,251,798 | 2/1981 | Swartz et al. | 340/146.3 SY |
| 4,289,957 | 9/1981 | Neyroud et al. | 235/462 |
| 4,308,455 | 12/1981 | Bullis et al. | 235/463 |
| 4,329,574 | 5/1982 | Jordan, Jr. | 235/463 |
| 4,360,798 | 11/1982 | Swartz et al. | 340/146.3 AG |
| 4,369,361 | 1/1983 | Swartz et al. | 235/470 |
| 4,387,297 | 6/1983 | Swartz et al. | 235/462 |
| 4,408,342 | 10/1983 | Grabowski et al. | 382/9 |
| 4,409,469 | 10/1983 | Yasuda et al. | 235/463 |
| 4,409,470 | 10/1983 | Shepard et al. | 235/472 |
| 4,421,978 | 12/1983 | Laurer et al. | 235/462 |
| 4,460,120 | 7/1984 | Shepard et al. | 235/472 |
| 4,488,678 | 12/1984 | Hara et al. | 235/463 |
| 4,496,831 | 1/1985 | Swartz et al. | 235/472 |
| 4,500,776 | 2/1985 | Laser | 235/162 |
| 4,593,186 | 6/1986 | Swartz et al. | 235/472 |
| 4,673,805 | 6/1987 | Shepard et al. | 235/472 |
| 4,717,818 | 1/1988 | Brookman et al. | 235/462 |
| 4,736,095 | 4/1988 | Shepard et al. | 235/472 |
| 4,746,789 | 5/1988 | Gieles et al. | 235/463 |
| 4,753,498 | 6/1988 | Saitoh et al. | 350/6.8 |
| 4,758,717 | 7/1988 | Shepard et al. | 235/472 |
| 4,760,248 | 7/1988 | Swartz et al. | 235/472 |
| 4,782,220 | 11/1988 | Shuren | 235/463 |
| 4,794,239 | 12/1988 | Allais | 235/462 |
| 4,896,026 | 1/1990 | Krichever et al. | 235/472 |
| 4,901,073 | 2/1990 | Kibrick | 341/13 |
| 4,916,297 | 4/1990 | Tukada et al. | 235/462 |
| 4,967,074 | 10/1990 | von Stein | 250/236 |
| 4,973,829 | 11/1990 | Ishida et al. | 235/462 |
| 5,028,772 | 7/1991 | Lapinski et al. | 235/467 |
| 5,045,677 | 9/1991 | Okamura | 235/462 |
| 5,124,538 | 6/1992 | Lapinski et al. | 235/467 |
| 5,155,343 | 10/1992 | Chandler et al. | 235/462 |
| 5,194,722 | 3/1993 | Mergenthaler | 235/463 |
| 5,241,164 | 8/1993 | Pavlidis | 235/462 |
| 5,262,625 | 11/1993 | Tom | 235/462 |
| 5,262,626 | 11/1993 | Goren et al. | 235/462 |
| 5,296,691 | 3/1994 | Waldron et al. | 235/462 |

FOREIGN PATENT DOCUMENTS

| | | |
|---|---|---|
| 0072910 | 3/1983 | European Pat. Off. |
| 0250778 | 1/1988 | European Pat. Off. |
| 0304804 | 3/1989 | European Pat. Off. |
| 60-86661 | 5/1985 | Japan |
| 1-133184 | 5/1989 | Japan |

*Primary Examiner*—Donald Hajec
*Assistant Examiner*—Jeffrey R. Filipek
*Attorney, Agent, or Firm*—Fish & Richardson

[57] ABSTRACT

A method for combining decoded scan fragments of a bar code symbol composed of a delimited plurality of bar code elements representing an ordered sequence of data characters. The method includes scanning the symbol along a first scan path that includes a delimiter to obtain a first sequence of data characters; scanning the symbol along a second scan path that includes another delimiter to obtain a second sequence of data characters; comparing the predetermined length to the lengths of the first and second sequences of data characters; and based on the comparison combining the first and second sequences to produce the ordered sequence of data characters.

21 Claims, 4 Drawing Sheets

BAR CODE SCAN STITCHING

BACKGROUND OF THE INVENTION

This invention relates to bar code scanning, and in particular to techniques for combining, or stitching, partial scans.

A bar code symbol is a coded pattern of indicia comprising a series of bars and spaces having different light reflecting characteristics. Bar code scanning systems electro-optically transform the indicia into electrical signals, which are decoded into alphanumerical characters. Characters are typically represented in digital form and are provided as an input to a data processing system for applications, such as point-of-sale processing and inventory control. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

Bar code symbols are formed from a series of bars and spaces, called elements, which have a variety of possible widths. The specific arrangement of elements defines the character represented according to a set of rules and definitions. To encode a desired sequence of characters, groups of elements are concatenated to form a bar code symbol, with each character of the message represented by a corresponding group of elements. In some symbologies a "start" and "stop" character is used to indicate where the bar code begins and ends. There are a number of symbologies in use, for example, UPC/EAN, Code 39, Code 128, Codabar, and Interleaved 2 of 5.

In typical scanning systems, a light source, such as a laser or laser diode, produces a beam which is directed by a lens or similar optical components along a light path toward a target that includes a bar code symbol on the surface. The beam produces a spot on the target. To scan with a laser system, the spot may be deflected by a mirror that is moved with an oscillating or rotating motor to produce a line or series of lines or curved paths across the symbol. Alternately, the light may be deflected holographically or by other means. A portion of the light that is reflected off the symbol is detected by a sensor which may be positioned in the scanner. The sensor converts the reflected light into an electrical signal which is converted to a digital representation by electronic circuitry. For example, an analog electrical signal from the photodetector may be converted into a pulse width modulated digital signal, with pulse widths corresponding to the physical widths of the bars and spaces.

The decoder receives the pulse width modulated digital signal from the scanner, and attempts to decode the scan. If the start and stop characters and all of the characters between them are decoded successfully, the decoding process is finished. Otherwise, the decoder receives a next scan and attempts to decode it. Each attempt is based on the signal received during a single scan. The process continues until a scan is completely decoded or until no more scans are available.

A scan line or series of scan lines may not always entirely cross the bar code symbol. For example, a scanner may be in a fixed position next to a conveyor with containers, each of which has a bar code symbol printed on a label. If the label is skewed with respect to the scan line, there may be no single scan line which includes both the start and stop characters. These incomplete scan lines, called fragments, were discarded until techniques were developed to stitch or combine the fragments together, so that the decoding process can be completed.

Several basic techniques have been employed to combine fragments. One technique, known as block decoding, involves combining predefined regions or blocks in a number of scans. For example, a symbology such as UPC has start, stop, and center characters. If one fragment includes a start and a center, and another fragment includes a center and stop, these two "blocks" can be combined to form a complete scan.

In another method, a system checks fragments for corresponding portions, and stitches by superimposing. For example, the widths of elements can be measured in clock pulses for two fragments. These widths may be converted to a binary representation of widths or of ratios of widths between successive elements. The pulse count or other representation of the width of an element in one scan is compared to the width of an element in another scan. If these are the same or sufficiently similar, adjacent elements are compared. If a group of elements of a certain length are the same, the two groups of elements are considered to be corresponding, and the two fragments of decoded data characters are stitched by superimposing the common portions.

In yet another method, for example shown in U.S. Pat. No. 4,488,678, using bar codes of a known number of bars, bar codes are combined at the bar level, that is, at the pre-decoded level, for subsequent decoding.

SUMMARY OF THE INVENTION

In general the invention features combining two decoded scan fragments of a bar code symbol using a character level technique. The bar code symbol is composed of bar code elements which represent an ordered sequence of data characters delimited by a "start" character on one end and a "stop" character on the other. The bar code is scanned and the fragments are decoded until a fragment with the "start" character and another with the "stop" character are found. Then, the two fragments are combined to form the required ordered sequence of data characters.

In some preferred embodiments, the ordered sequence is of a predetermined character length. The character length of the fragments is compared to the predetermined character length, and the fragments are combined if the sum of the lengths of the fragments is equal to the predetermined length. If the sum of the fragment lengths is greater than the predetermined length, then the overlapping portions of the segments are compared, and, if the corresponding data characters of the overlapping portions match, then the fragments are combined by overlapping the matching portions to form the required ordered sequence of data characters.

If the sum of the fragment lengths is less than the predetermined length, or if the overlapping portions do not match, then new sequences of characters are scanned and the process is repeated.

In another aspect of the invention, when overlapping data characters do not match, the data characters from the segment which was scanned the most times (or most recently) are used.

In yet another aspect of the invention, the predetermined character length is obtained by decoding scans containing full crossings (including the "start" and "stop" characters) of a representative bar code of the predetermined character length, and then storing and saving that character length for subsequent use.

In other preferred embodiments, the ordered sequence encodes a checksum value. The fragments are combined and their checksum value is determined and compared to the encoded checksum value. Based on the comparison, if the checksum value of the combined fragments is equal to the encoded checksum value, then the first and second fragments are combined to produce the required ordered sequence of data characters.

In yet other preferred embodiments, the method computes the probability that the combined fragments form a valid data character sequence. If this probability is greater than some predetermined acceptable probability, then the first and second fragments are combined to produce the required ordered sequence of data characters.

In another aspect of the invention, the segments to be matched are restricted to only those segments which are scanned within a predetermined acceptable period of time.

In another aspect of the invention, the segments to be matched are restricted to only those segments which are scanned in a direction consistent with each other and the physical scan pattern.

Other features and advantages will become apparent from the following description of the preferred embodiments and from the claims.

DESCRIPTION OF THE PREFERRED EMBODIMENTS

Figure 1:
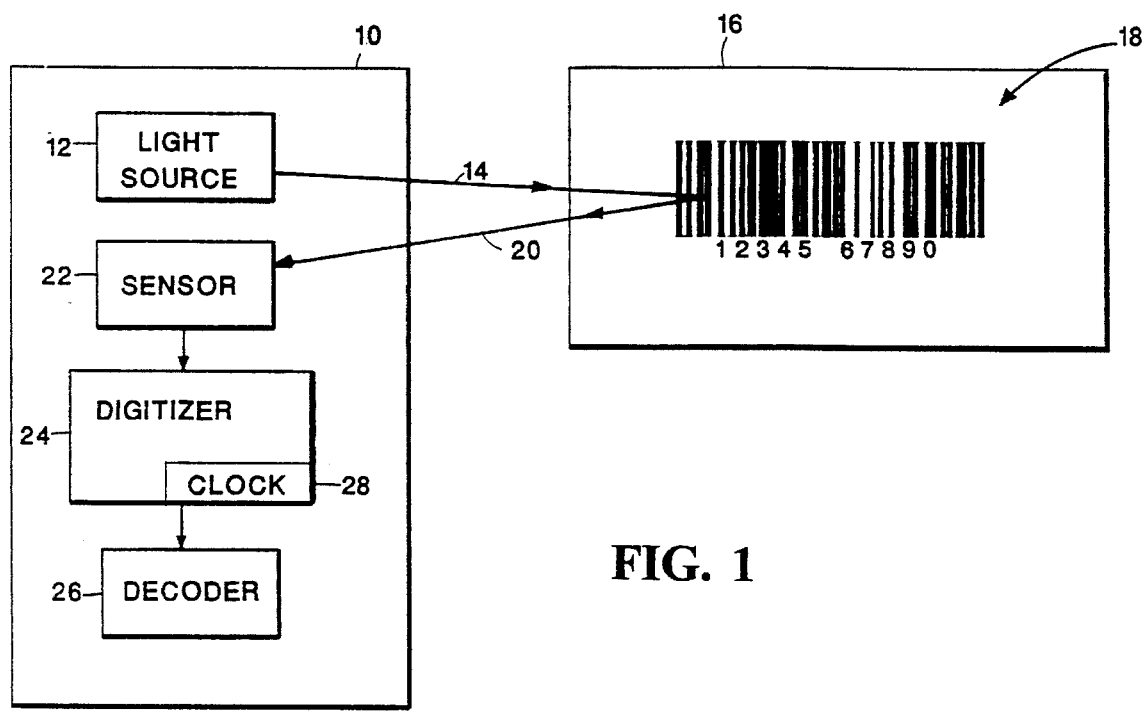
FIG. 1 is a block diagram of a scanning system.

Referring to FIG. 1, scanning system 10 is used to read and interpret bar code symbols. Light source 12 directs a beam of light 14 at bar code 18 which is printed or affixed on target 16. Bar code symbol 18 reflects diffused light 20 which is received by sensor 22. The sensor produces an analog signal which indicates how much light is received from the reflected beam as the beam scans the bar code. The analog signal is digitized by digitizer 24, and the resulting digital signal is sent to a decoder 26. The digital signal consists of a series of pulse width values, each representative of the time it took for the scan to cross an element. The time is determined by clock 25 which counts cycles beginning on a leading or falling edge of the digital signal. A representation of the time that each element is scanned is stored so that a set of discrete integers represents the pulse widths of elements in the time domain. Decoder 26 converts the digital signal to a series of alphanumeric characters according to algorithms specific to the symbology used.

Figure 2:
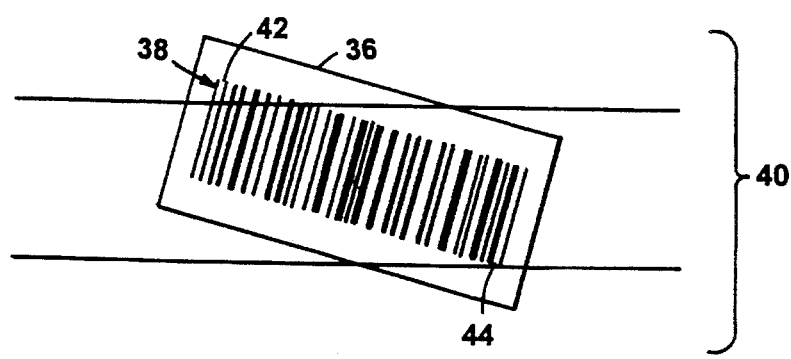
FIGS. 2 and 4a–4c are pictorial representations of bar codes and scan fragments.

In some cases, the bar code cannot be completely read with a single scan line. Referring to FIG. 2, bar code symbol 38 is printed on label 36. The symbol includes data characters, a start character 42, and a stop character 44. Scan lines 40 are horizontal, but the label is skewed so that no single scan line passes through both start character 42 and stop character 44. Scan lines 40 are therefore all fragments. While no scan has all the elements, each element can be determined from at least one scan line.

Figure 4A:
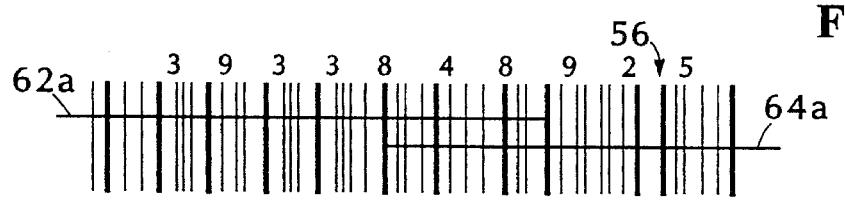
Figure 5:
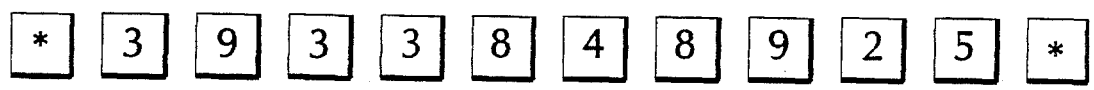
FIG. 5 is a representation of the data represented by the bar code of FIG. 4a–4c.

The sequence of data characters represented in FIG. 5 (the characters "*" on either end of the sequence are the start and stop delimiter characters) can be represented, for example, by bar code symbol 56 shown in FIG. 4(a). (Alternatively, a correct decoding of the bar code symbol in FIG. 4(a) should produce the sequence of data characters represented in FIG. 5.)

Figure 4B:
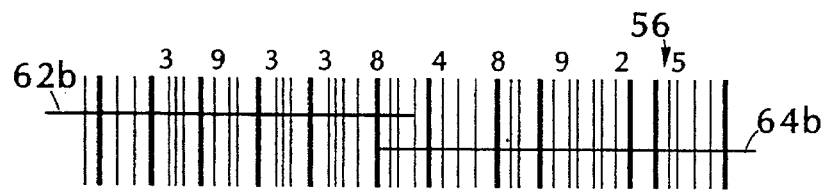
Figure 4C:

The examples in FIGS. 4(a)–(c) show three possible outcomes of two partial scans 62 and 64.

The two partial scan fragments 62a and 64a in FIG. 4(a) together cross every element of bar code 56. These two scan fragments also partially overlap for some bar code elements (and for some data characters). Scan fragment 62a covers data characters "3933848", and scan fragment 64a covers data characters "848925". These partial scans overlap on data characters "848". It should be noted that while scan 62a covers some elements of the data character "9" at its right-most end, it does not cover enough elements to decode that character. Similarly, while scan 64a covers some elements of the data character "3" at its left-most end, it too does not cover enough elements to decode that character.

The two partial scan fragments 62b and 64b in FIG. 4(b) also cross every element of bar code 56, and they also overlap for some elements, but they do not overlap for any data characters. Scan fragment 62b covers data characters "39338", and scan fragment 64b covers data characters "4892".

In FIG. 4(c) the two partial scans 62c and 64c do not cover the entire symbol 56 and do not overlap. Scan fragment 62c covers only data characters "39338", and scan fragment 64c covers only data characters "8925". Neither scan covers the data character "4".

Figure 6:
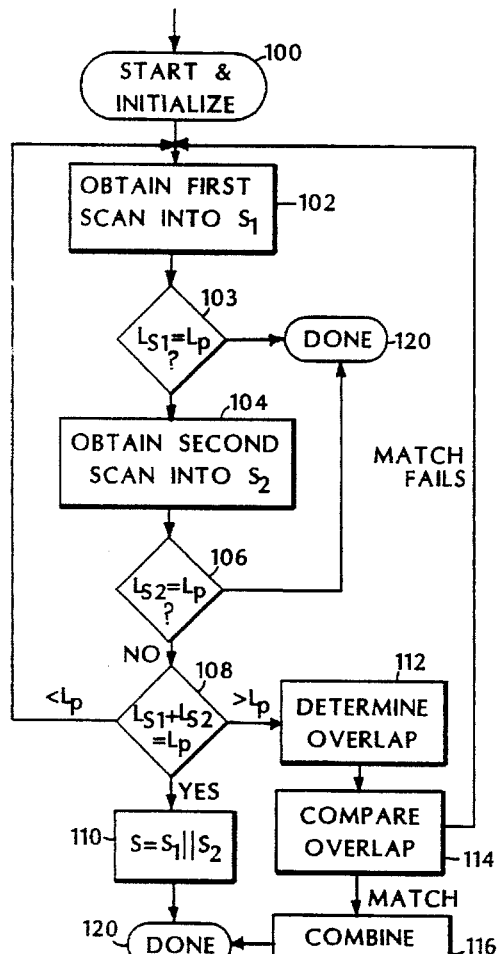
FIGS. 6–11 are flow charts of preferred embodiments.

In one embodiment, referring to FIG. 6, a method for combining or stitching two decoded partial scans begins with setting various global variables, such as the required or expected predetermined length, $L_p$, of the expected scan. Note that the length $L_p$ is the expected or required number of data characters encoded by the bar code symbol, and not the number of elements in the symbol itself. Thus, for example, the length of symbol 56 in FIG. 4(a) is ten (excluding delimiter characters).

After the initializing step 100, the sequence of data characters, $S_1$, corresponding to first decoded partial scan, is obtained at 102. The length of the sequence $S_1$ is compared at 103 to the expected predetermined length, $L_p$, to determine whether or not a complete scan was achieved. If so, then processing is complete at 120, otherwise a second sequence of data characters, $S_2$, corresponding to a second decoded partial scan, is obtained at 104.

Note that both $S_1$ and $S_2$ are sequences of data characters corresponding to decoded partial scans. The lengths of the sequences $S_1$ and $S_2$, designated $L_{S1}$ and $L_{S2}$ respectively, are the number of data characters in the sequences.

As was the case with the first scan $S_1$, the length of the second data character sequence $S_2$ is compared at 106 to the expected predetermined length, $L_p$, to determine whether or not a complete scan was achieved. If so, then processing is complete at 120, otherwise processing continues to determine whether the two sequences can be combined.

The next step 108 compares the combined lengths, $L_{S1}+L_{S2}$, of the two partial sequences $S_1$ and $S_2$, to the expected length, $L_p$. Since at this point neither sequence is a complete scan, one of the three situations depicted in FIGS. 4(a)–(c) has occurred.

If the combined lengths are less than the expected length, corresponding to the case shown in FIG. 4(c), then the system attempts to obtain another first scan at 102. If the combined lengths are the same as the expected length, corresponding to the case shown in FIG. 4(b), then the two sequences are combined at 110, for example, by concatenating them, and processing is completed at 120.

In the case where the combined lengths exceed the expected length, corresponding to the case shown in FIG. 4(a), the amount of overlap is determined at 112 and the overlapping portions of the sequences are compared at 114. If the overlapping portions match each other, then the two sequences are combined at 116 and processing is completed at 120, otherwise, the process is restarted.

Figure 3:
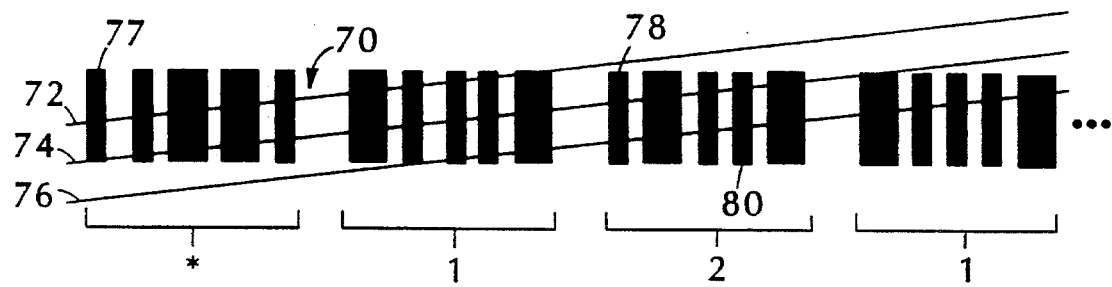
FIG. 3 is a pictorial representation of a portion of a bar code symbol.

Referring to FIG. 3, there is shown, by way of example, the first four characters of a bar code in the Code 39 symbology. A Code 39 character has nine elements, five bars and four spaces, each of which is either narrow or wide. Of the nine elements, three are wide and six are narrow. A Code 39 symbol starts and stops with an asterisk, and can be scanned and read in either direction. Between each character is an inter-character space 70 which can be set to some selected width (the width of which is not significant).

Figure 7:
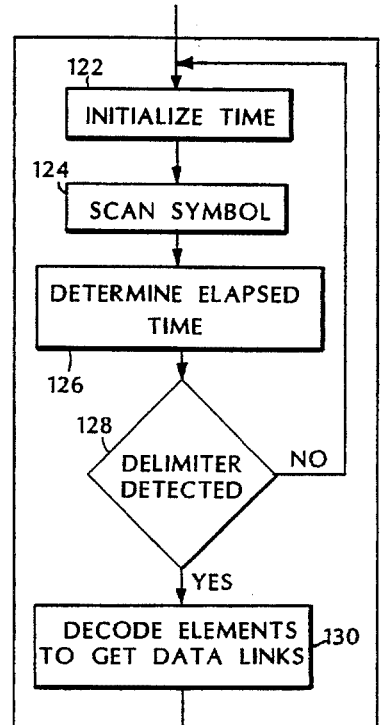

FIG. 7 shows the steps 102 and 104 of obtaining the first and second scans in greater detail.

Referring to FIG. 7 in conjunction with FIG. 3, the decoder initializes the time at 122, loads a scan at 124, and determines the elapsed time at 126. It then determines whether a delimiter character is detected at 128. If not, the decoder resets the time and loads further scans, until a delimiter character is detected. For scan 72, in FIG. 3, the asterisk start/stop character is detected, so the decoder attempts to decode the characters at 130 by loading nine elements at a time, and checking whether these elements represent a valid character. The decoder would load the next nine elements after the asterisk, and successfully decode a numeral "1". But when attempting to decode the next nine elements, the decoder would fail, as it would encounter fewer than nine elements.

In alternate embodiments, the decoder determines the expected length at the initialization step 100 by obtaining a complete scan of a representative bar code symbol and determining its length. This length is then used as the expected length for subsequent scans.

Clock cycles are counted during the scan, so the elapsed time for the scan to reach a particular element is known. The elapsed time between two scans is also known.

Figure 8:
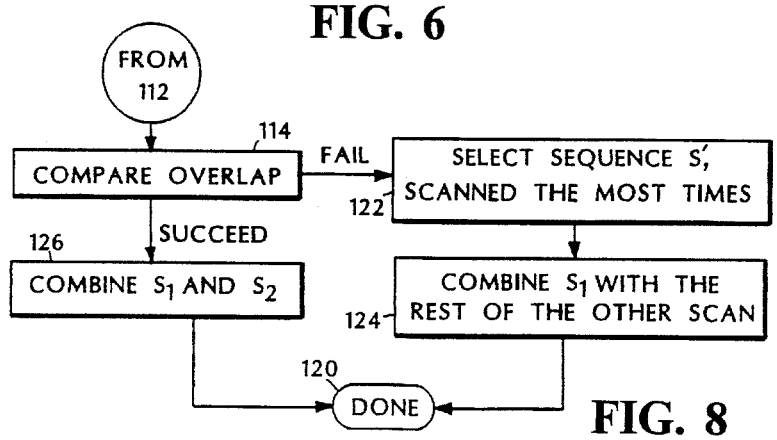

In another embodiment, as shown in FIG. 8, if the comparison of the overlapping portions at 114 fails to determine a match, then, instead of restarting (as in the embodiment shown in FIG. 6), the system selects the sequence of data characters that was scanned the most times (or most recently) at 122, and combines it with the non-overlapping part of the other sequence.

The size in characters of the overlapping portion, $L_{overlap}$, can be determined, for example, by the formula:

$$L_{overlap} = (L_{S1} + L_{S2}) - L_p$$

Thus, if, for example, $S_1$ is selected at 122 as the sequence scanned the most times, then the data characters in $S_1$ are combined with the non-overlapping ($L_{S2} - L_{overlap}$) data characters of $S_2$.

Figure 9:
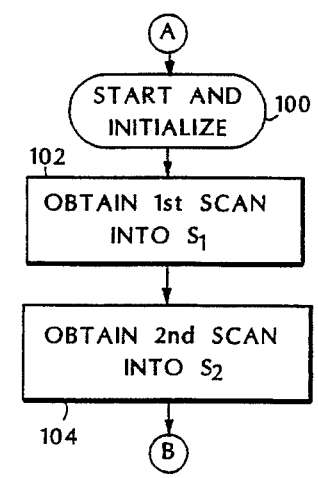
Figure 10:
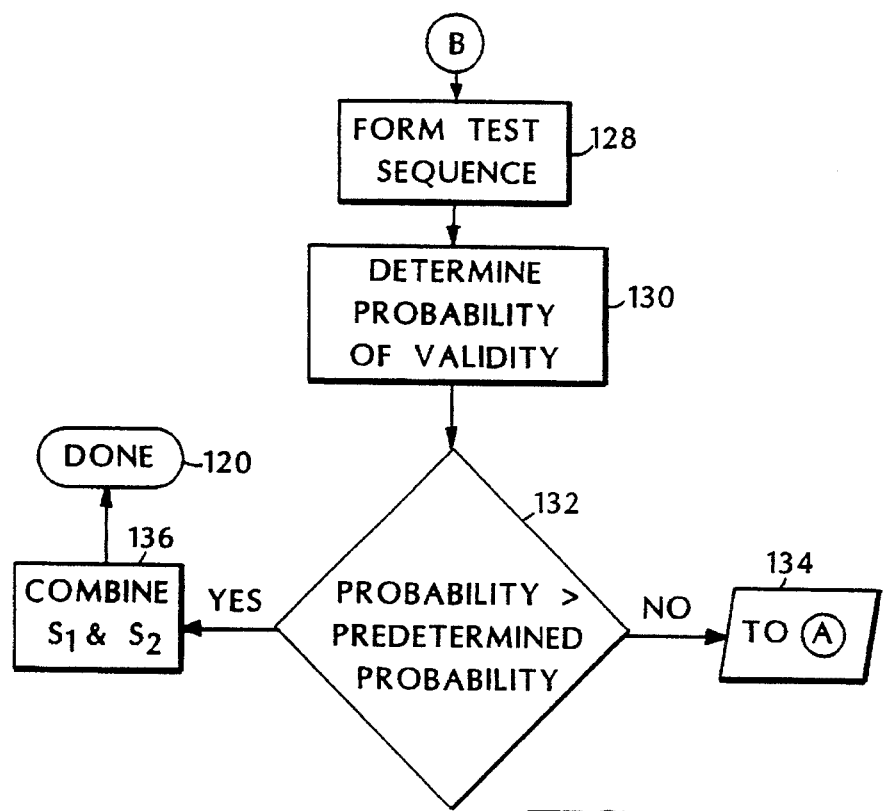

Referring to FIGS. 9–10, in another embodiment, the initialization at step 100 includes setting a global variable corresponding to an acceptable probability value. Then, after the two partial sequences of data characters, corresponding to two decoded partial scans, are obtained (at 102 and 104), a test sequence of the two partial sequences is formed at 128. The probability that the test sequence is a valid character sequence is determined at 130, and compared to the acceptable probability value at 132. If the comparison finds that test character sequence to have an acceptable probability of validity then the two partial sequences are combined at 136 and processing is done at 120. If the probability is not acceptable then two new scans are obtained at 134.

The probability of validity may, for example, be based on the likelihood of two characters being adjacent within the test sequence. This likelihood may depend on the particular encoding symbology used. The test sequence may, for example, be formed by concatenation, combining overlapping portions, or some other means. The embodiment of FIGS. 9–10 has the advantage that it can be applied to symbols of variable character length.

Figure 11:
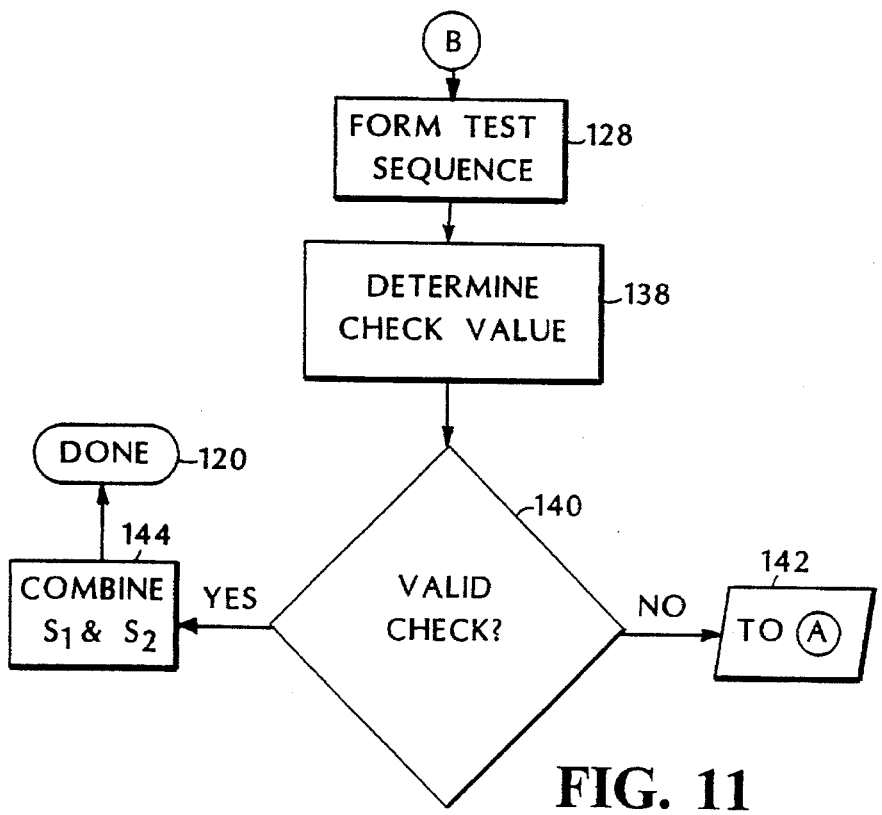

Referring to FIGS. 9–11, in yet another embodiment, after the initialization step 100, and after the two partial sequences of data characters, corresponding to two decoded partial scans, are obtained (at 102 and 104), a test sequence of the two partial sequences is formed at 128. Then a check value, for example, a checksum, of the test sequence is determined at 138. If the check value is determined to be a valid check value at 140, then the two partial sequences are combined at 144 and processing is done at 120. If the check value is not valid then new scans are obtained at 134.

The check value may, for example, be part of the code's symbology (for example, Code 128 uses a check digit), or it may be a user-encoded value. As with the previous embodiment, the test sequence may be formed by concatenation, combining overlapping portions, or some other means.

The previous two embodiments may be combined to give an embodiment in which both a check value and a probability of validity are determined.

Other embodiments are within the following claims.

What is claimed is:

1. A method for combining decoded scan fragments of a bar code symbol composed of a plurality of bar code elements representing an ordered sequence of characters, wherein the ordered sequence is delimited by a first delimiting character and a second delimiting character, and wherein the ordered sequence has a predetermined length, the method comprising the steps of:

scanning the symbol along a plurality of scan paths and decoding the scanned elements to obtain decoded sequences of characters;

determining whether the decoded sequences of characters includes one of the first and second delimiting characters;

repeating the scanning and determining steps until at least a first decoded sequence with the first delimiting character and a second decoded sequence with the second delimiting character are found, said first and second decoded sequences having respective lengths;

comparing the predetermined length to a sum of the lengths of the first and second decoded sequences of data characters; and based on the comparison and independently of the respective lengths of the first and second decoded sequences, combining the first and second sequences to produce the ordered sequence of data characters.

2. A method for combining decoded scan fragments of a bar code symbol composed of a plurality of bar code elements representing an ordered sequence of characters, wherein the ordered sequence is delimited by a first delimiting character and a second delimiting character, and wherein the ordered sequence has a predetermined length, the method comprising the steps of:

scanning the symbol along a plurality of scan paths and decoding the scanned elements to obtain decoded sequences of characters;

determining whether the decoded sequences of characters includes one of the first and second delimiting characters;

repeating the scanning and determining steps until at least a first decoded sequence with the first delimiting character and a second decoded sequence with the second delimiting character are found;

comparing the predetermined length to lengths of the first and second decoded sequences of data characters; and based on the comparison, combining the first and second sequences to produce the ordered sequence of data characters by concatenating the first and second decoded sequences to produce the ordered sequence if the sum of the character lengths of the first and second sequences is equal to the predetermined length.

3. The method of claim 2 wherein the combining step further comprises, in the event that the sum of the lengths of the first and second sequences of characters is greater than the predetermined length, performing the following steps:

comparing overlapping portions of the first and second sequences of data characters; and based on the comparison of the overlapping portions, in the event that the overlapping portions of the first and second sequences of data characters match, combining the first and second sequences of data characters to produce the ordered sequence.

4. The method of claim 2 wherein the combining step further comprises, in the event that the sum of the lengths of the first and second sequences of characters is less than the predetermined length, repeating the steps of scanning, determining, repeating, and comparing the lengths.

5. The method of claim 3 wherein the combining step further comprises, in the event that the sum of the lengths of the first and second sequences of characters is less than the predetermined length, repeating the steps of scanning, determining, repeating, and comparing the lengths.

6. The method of claim 3 or 5 wherein the combining step comprises, in the event that the overlapping portions of the first and second sequences of data characters do not match, repeating the steps of scanning, determining, repeating, and comparing the lengths.

7. The method of claim 3 or 5 wherein the step of combining further comprises, in the event that the overlapping portions of the first and second decoded sequences of characters do not match, combining the first and second sequences of characters to produce the ordered sequence by the steps of:

(i) selecting a sequence of the first and second sequences of characters corresponding to the scan path that was scanned the most times or to the most recent scan path, and (ii) combining the selected sequence with a sequence obtained by removing the overlapping portion from the sequence of the first and second sequences of characters not selected.

8. A method for combining scan fragments of a bar code symbol composed of a plurality of bar code elements representing an ordered sequence of data characters, wherein the ordered sequence is delimited by a first delimiting character and a second delimiting character and has a predetermined length, the method comprising the steps of:

(A) scanning the symbol along a plurality of scan paths and decoding the scanned elements to obtain decoded sequences of characters;

(B) determining whether the decoded sequences of characters includes one of the first and second delimiting characters;

(C) repeating the scanning and determining steps until at least a first decoded sequence with the first delimiting character and a second decoded sequence with the second delimiting character are found;

(D) comparing the lengths of the first and second sequences of data characters to the predetermined length;

(E) in the event that the sum of the lengths of the first and second sequences of data characters is equal to the predetermined length, combining the first and second sequences of data characters to produce the ordered sequence of data characters;

(F) in the event that the sum of the lengths of the first and second sequences of data characters is greater than the predetermined length, performing the following steps:

comparing overlapping portions of the first and second sequences of data characters, based on the comparison of the overlapping portions, in the event that the overlapping portions of the first and second sequences of data characters match, combining the first and second sequences of data characters to produce the ordered sequence of data characters, and based on the comparison of the overlapping portions, in the event that the overlapping portions of the first and second sequences of data characters do not match, repeating the scanning, determining, repeating, and comparing steps; and in the event that the sum of the lengths of the first and second sequences of data characters is less than the predetermined length, repeating steps (A) through (F).

9. The method of claim 8, further comprising the steps of:

measuring the elapsed time between finding the first decoded sequence and finding the second decoded sequence;

comparing the elapsed time to a predetermined acceptable elapsed time;

in the event that the elapsed time is less than the predetermined acceptable elapsed time, performing the remaining steps of the method; and in the event that the elapsed time exceeds the predetermined acceptable time, repeating the scanning, determining, and repeating steps.

10. A method for combining scan fragments of a bar code symbol composed of a plurality of bar code elements representing an ordered sequence of data characters, wherein the ordered sequence is delimited by a first delimiting character and a second delimiting character, and encodes a predetermined check value, the method comprising the steps of:

(A) scanning the symbol along a plurality of scan paths and decoding the scanned elements to obtain decoded sequences of characters;

(B) determining whether the decoded sequences of characters includes one of the first and second delimiting characters;

(C) repeating the scanning and determining steps until at least a first decoded sequence with the first delimiting character and a second decoded sequence with the second delimiting character are found, said first and second decoded sequences having respective lengths;

(D) independently of the respective lengths of the first and second decoded sequences, combining the first and second sequences of data characters to form a test sequence of data characters;

(E) determining a test check value for the test sequence;

(F) comparing the test check value to the predetermined encoded check value; and (G) in the event that the test check value is substantially equal to the predetermined check value, combining the first and second sequences of data characters to produce the ordered sequence of data characters.

11. The method of claim 10, further comprising the step of:

in the event that the test check value is not substantially equal to the predetermined encoded check value, repeating the steps (A) through (G).

12. A method for combining scan fragments of a bar code symbol composed of a plurality of bar code elements representing an ordered sequence of data characters, wherein the ordered sequence is delimited by a first delimiting character and a second delimiting character and has a fixed length, the method comprising the steps of:

first, determining the fixed length by the steps of: scanning an entire representative bar code symbol along a scan path which includes the first and second delimiting characters to obtain a representative series of elements;

decoding the representative series of elements to obtain a representative sequence of data characters; and counting the number of data characters in the representative sequence of data characters to obtain the fixed length, and then:

(A) scanning the symbol along a plurality of scan paths and decoding the scanned elements to obtain decoded sequences of characters;

(B) determining whether the decoded sequences of characters includes one of the first and second delimiting characters;

(C) repeating the scanning and determining steps until at least a first decoded sequence with the first delimiting character and a second decoded sequence with the second delimiting character are found;

(D) comparing the fixed length to the lengths of the first and second sequences of data characters; and (E) in the event that the sum of the lengths of the first and second sequences is equal to the fixed length, combining the first and second sequences to produce the ordered sequence of data characters.

13. The method of claim 12, further comprising the step of:

(F) in the event that the sum of the lengths of the first and second sequences of data characters is greater than the fixed length, performing the following steps:

comparing overlapping portions of the first and second sequences of data characters; and based on the comparison of the overlapping portions, in the event that the overlapping portions of the first and second sequences of data characters match, combining the first and second sequences of data characters to produce the ordered sequence.

14. The method of claim 12, further comprising the step of:

(F) based on the comparison, in the event that the sum of the lengths of the first and second sequences of data characters is less than the fixed length, repeating steps (A) through (E).

15. The method of claim 13, further comprising the step of:

(G) based on the comparison of the lengths, in the event that the sum of the lengths of the first and second sequences of data characters is less than the fixed length, repeating steps (A) through (F).

16. The method of one of claims 13, 14 or 15 wherein step (F) further includes performing the step of:

based on the comparison of the overlapping portions, in the event that the overlapping portions of the first and second sequences of data characters do not match, repeating steps (A) through (F).

17. The method of one of claims 13, 14 or 15 wherein step (F) further includes performing the step of:

based on the comparison of the overlapping portions, in the event that the overlapping portions of the first and second sequences of data characters do not match, combining the first and second sequences of data characters to produce the ordered sequence by the steps of:

selecting a sequence of the first and second sequences of data characters corresponding to the scan path that was scanned the most times, and combining the selected sequence with a sequence obtained by removing the overlapping portion from the sequence of the first and second sequences of data characters not selected.

18. A method for combining scan fragments of a bar code symbol composed of a plurality of bar code elements representing an ordered sequence of data characters, wherein the ordered sequence is delimited by a first delimiting character and a second delimiting character and has a fixed length, the method comprising the steps of:

first, determining the fixed length, and then:

(A) scanning the symbol along a plurality of scan paths and decoding the scanned elements to obtain decoded sequences of characters;

(B) determining whether the decoded sequences of characters includes one of the first and second delimiting characters;

(C) repeating the scanning and determining steps until at least a first decoded sequence with the first delimiting character and a second decoded sequence with the second delimiting character are found;

(D) comparing the lengths of the first and second sequences of data characters to the fixed length;

(E) based on the comparison of the lengths, in the event that the sum of the lengths of the first and second sequences of data characters is equal to the fixed length, combining the first and second sequences of data characters to produce the ordered sequence of data characters;

(F) based on the comparison of the lengths, in the event that the sum of the lengths of the first and second sequences of data characters is greater than the fixed length, performing the following steps:

(G) comparing overlapping portions of the first and second sequences of data characters, (H) based on the comparison of the overlapping portions, in the event that the overlapping portions of the first and second sequences of data characters match, combining the first and second sequences of data characters to produce the ordered sequence of data characters, and (I) based on the comparison of the overlapping portions, in the event that the overlapping portions of the first and second sequences of data characters do not match, repeating steps (A) through (I); and (J) based on the comparison of the lengths, in the event that the sum of the lengths of the first and second sequences of data characters is less than the fixed length, repeating steps (A) through (J).

19. The method of claim 18 wherein the step of determining the fixed length comprises the steps of:

scanning an entire representative bar code symbol along a scan path which includes the first and second delimiter characters to obtain a representative series of elements;

decoding the representative series of elements to obtain a representative sequence of data characters; and counting the number of data characters in the representative sequence of data characters to obtain the fixed length.

20. The method of one of claims 12, 18 or 19, further comprising the steps of:

determining the elapsed time between the step of scanning along the first path and the step of scanning along the second scanning path;

comparing the elapsed time to a predetermined acceptable elapsed time;

based on the comparison of the times, in the event that the elapsed time is less than the predetermined acceptable elapsed time, performing the remaining steps of the method;

based on the comparison of the times, in the event that the elapsed time exceeds the predetermined acceptable time, repeating steps (A) through (C).

21. A method for combining decoded scan fragments of a bar code symbol composed of a plurality of bar code elements representing an ordered sequence of characters, wherein the ordered sequence is delimited by a first delimiting character and a second delimiting character, and wherein the ordered sequence has a predetermined length, the method comprising the steps of:

scanning the symbol along a plurality of scan paths and decoding the scanned elements to obtain decoded sequences of characters;

determining whether the decoded sequences of characters includes one of the first and second delimiting characters;

repeating the scanning and determining steps until at least a first decoded sequence with the first delimiting character and a second decoded sequence with the second delimiting character are found;

measuring the elapsed time between finding the first decoded sequence and finding the second decoded sequence;

comparing the elapsed time to a predetermined acceptable elapsed time, wherein in the event that the elapsed time is less than the predetermined acceptable elapsed time, performing the remaining steps of the method, and in the event that the elapsed time exceeds the predetermined acceptable time, repeating the scanning, determining, and repeating steps;

comparing the predetermined length to lengths of the first and second decoded sequences of data characters; and based on the comparison, combining the first and second sequences to produce the ordered sequence of data characters.

* * * * *

UNITED STATES PATENT AND TRADEMARK OFFICE
CERTIFICATE OF CORRECTION

PATENT NO. : 5,457,308
DATED : October 10, 1995
INVENTOR(S) : Glenn Spitz and Nelson Saenz It is certified that error appears in the above-indentified patent and that said Letters Patent is hereby corrected as shown below:

Col. 4, line 27, "4892" should be --48925--.

Signed and Sealed this

Twenty-third Day of January, 1996

Attest:

BRUCE LEHMAN

Attesting Officer     Commissioner of Patents and Trademarks